(12) United States Patent
Niu et al.

(10) Patent No.: US 7,057,857 B1
(45) Date of Patent: Jun. 6, 2006

(54) DIMPLE PIVOT POST FOR A ROTARY CO-LOCATED MICROACTUATOR

(75) Inventors: Yimin Niu, Fremont, CA (US); Edmund Bruno Fanslau, Jr., San Jose, CA (US); Weijin Li, San Jose, CA (US)

(73) Assignee: Western Digital (Fremont), Inc., Fremont, CA (US)

(*) Notice: Subject to any disclaimer, the term of this patent is extended or adjusted under 35 U.S.C. 154(b) by 139 days.

(21) Appl. No.: 10/326,514

(22) Filed: Dec. 20, 2002

(51) Int. Cl.
*G11B 21/16* (2006.01)
(52) U.S. Cl. .................................. 360/245.4
(58) Field of Classification Search ............ 360/294.4, 360/294.6, 245.1, 245.4, 245.6
See application file for complete search history.

(56) References Cited

U.S. PATENT DOCUMENTS

| | | | |
|---|---|---|---|
| 5,473,488 A * | 12/1995 | Gustafson et al. | 360/245.5 |
| 5,608,590 A * | 3/1997 | Ziegler et al. | 360/245.5 |
| 5,659,448 A * | 8/1997 | Shimizu et al. | 360/245.1 |
| 5,898,541 A | 4/1999 | Boutaghou et al. | 360/109 |
| 5,959,808 A * | 9/1999 | Fan et al. | 360/294.3 |
| 6,118,637 A | 9/2000 | Wright et al. | 360/294.1 |
| 6,215,629 B1 * | 4/2001 | Kant et al. | 360/290 |
| 6,246,552 B1 | 6/2001 | Soeno et al. | 360/294.4 |
| 6,297,936 B1 * | 10/2001 | Kant et al. | 360/294.4 |
| 6,760,196 B1 | 7/2004 | Niu et al. | |

FOREIGN PATENT DOCUMENTS

JP  03189976 A  *  8/1991
JP  05128771 A  *  5/1993

OTHER PUBLICATIONS

Wei Guo et al. "Dual-Stage Servo System With Microactuated Head Gimbal Assemblies," Journal of Information Storage and Processing Systems, vol. 2, pp. 101-108, 2000.

* cited by examiner

*Primary Examiner*—David Davis
(74) *Attorney, Agent, or Firm*—Hogan & Hartson LLP

(57) ABSTRACT

A rotary microactuator-based head-gimbal assembly design controls the unwanted deflection of a flexure in a data storage device and eliminates hinge deformation. The head-gimbal assembly maintains the co-planarity of the hinged islands in the microactuator under the applied load acting on the flexure and two associated hinged islands. The dimple post is placed at the dimple loading region of the flexure tongue and has the same height as adhesive dams on paddles secured to the hinged islands. The dimple post is formed by branching one of the existing conductive traces covered by a photoresist layer to the dimple loading region on flexure tongue. In an alternative embodiment, the dimple post is secured to the dimple loading region of the flexure tongue by means of adhesives with a variety of viscosity and elastic moduli.

31 Claims, 19 Drawing Sheets

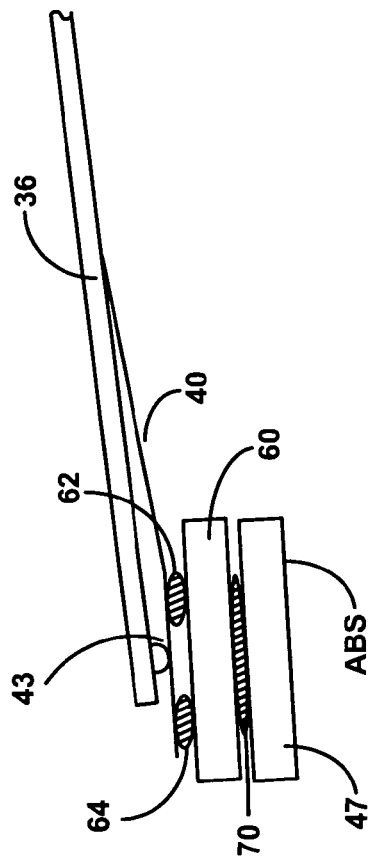
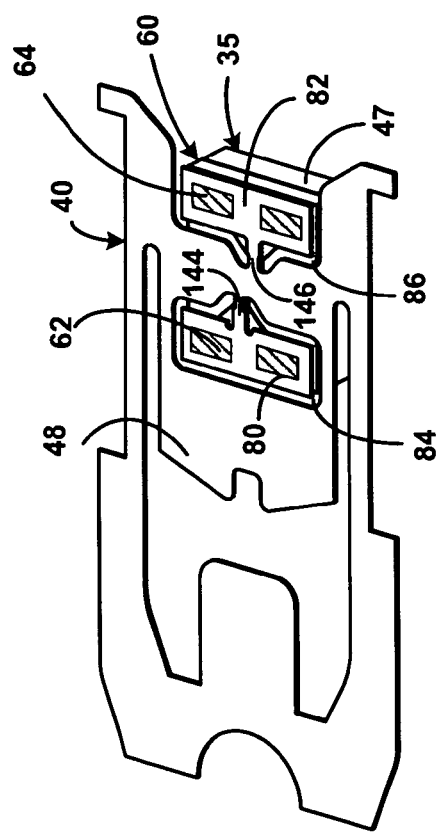

DIMPLE PIVOT POST FOR A ROTARY CO-LOCATED MICROACTUATOR

CROSS-REFERENCE TO RELATED APPLICATION

The present application is related to patent application Ser. No. 10/016,027, titled "Microactuator With Offsetting Hinges And Method For High-Resolution Positioning Of Magnetic Read/Write Head," filed Dec. 12, 2001, issued as U.S. Pat. No. 6,760,196, which is assigned to the same assignee as the present application, and which is incorporated herein by reference.

FIELD OF THE INVENTION

The present invention relates in general to data storage systems such as disk drives, and it particularly relates to a read/write head, such as a thin film head, a MR head, or a GMR head for use in such data storage systems. More specifically, the present invention provides a novel design of a rotary co-located microactuator, such as a piezoelectric microactuator, that is interposed between a flexure tongue and a slider to provide three-dimensional lateral (in-plane) and vertical (out-of-plane) micro-motion of the read/write head. The lateral motion can be used to rapidly and precisely position the read/write head on a data track. The vertical motion can be used for an active control of the fly height of the magnetic read/write head. The induced slider crown and camber are used to compensate for thermal expansion of the magnetic read/write head, which causes the slider to be displaced at an unintended fly height position relative to the surface of the magnetic recording disk.

BACKGROUND OF THE INVENTION

In a conventional magnetic storage system, a magnetic head includes an inductive read/write transducer mounted on a slider. The magnetic head is coupled to a rotary voice coil actuator assembly by a suspension over a surface of a spinning magnetic disk.

In operation, a lift force is generated by the aerodynamic interaction between the magnetic head and the spinning magnetic disk. The lift force is opposed by equal and opposite spring forces applied by the suspension such that a predetermined fly height (or fly height) is maintained over a full radial stroke of the rotary arm actuator assembly above the surface of the spinning magnetic disk. The fly height is defined as the spacing between the surface of the spinning magnetic disk and the read/write poles of the slider.

One objective of the design of magnetic read/write heads is to obtain a very small fly height between the read/write element and the disk surface. By maintaining a fly height close to the disk, it is possible to record high frequency signals, thereby achieving a high bit density and high storage data recording capacity.

The slider design incorporates an air bearing surface to control the aerodynamic interaction between the magnetic head and the spinning magnetic disk thereunder. Air bearing surface (ABS) sliders used in disk drives typically have a leading edge and a trailing edge at which read/write sensors are deposited. Generally, the ABS surface of a slider incorporates a patterned topology by design to achieve a desired pressure distribution during flying. In effect, the pressure distribution on the ABS contributes to the flying characteristics of the slider that include fly height, pitch, and roll of the read/write head relative to the rotating magnetic disk.

In a conventional magnetic media application, a magnetic recording disk is comprised of several concentric tracks onto which magnetization bits are deposited for data recording. Each of these tracks is further divided into sectors where the digital data are registered.

As the demand for large capacity magnetic storage continues to grow, the current trend in the magnetic storage technology has been proceeding toward a high track density design of magnetic storage media. In order to maintain the industry standard interface, magnetic storage devices increasingly rely on reducing trackwidth as a means to increase the track density without significantly altering the geometry of the storage media.

A smaller track width poses several mechanical and electrical problems to the operation of magnetic disk drives. One such problem lies in its actuation and control feature, which is critical to the operation of a magnetic disk drive. In order to appreciate the magnitude of this problem, it might be important to further describe the control aspect of a conventional magnetic read/write head.

In a conventional magnetic disk drive, a read/write head features a transducer that is integrated into a slider. The slider is in turn attached to a stainless steel flexure. The flexure and the load beam to which the flexure is attached, form a suspension arm. The suspension arm is connected to one distal end of an actuator arm, which is driven by a voice coil actuator (or VCM) at the other distal end, to cause it to rotate at its mid-length about a pivot bearing.

The suspension arm exerts an elastic force to counteract the aerodynamic lift force generated by the pressure distribution on the ABS of the slider. The elastic force together with the stiffness of the suspension arm controls the stability of the actuator arm with respect to the pitch, roll, and yaw orientations. With respect to the control feature of the magnetic disk drive, during each read or write operation, there are usually two types of positioning controls: a track-seek control and a track-follow control.

A track-seek and follow control is typically commanded when data are to be retrieved from, or new data are to be written to a particular sector of a data track. Electronic circuitry incorporating an embedded feedback control software, supplies a necessary voltage to the VCM to actuate the VCM to drive the actuator arm, to which the read/write head is attached, to a target track. Thus, a track-seek control performs a low-resolution or coarse positioning of the read/write head from one data track to another data track and also following track of corresponding track pitch density Upon the completion of a track-seek control, subsequent data operation is typically confined to within the target track. In the earlier stage of the magnetic storage technology, a typical data track is sufficiently wide so that small variations in the position of the read/write head resulting from external disturbances to the track-seek control plant do not cause the position of the read/write head to exceed the prescribed control error allowance.

As the track width reduces as a means to increase the track density and hence the storage capacity of magnetic disk drives, the foregoing single-stage actuation design encounters a significant degree of difficulty, mainly due to the excessive control error of the track-seek control using the VCM. In particular, a single-stage actuation using the VCM is found to be inadequate because the resulting control error due to external disturbances, such as inertial shock loading or noise sometimes, could cause the read/write head to be positioned over tracks that are adjacent to the target track, thus possibly causing a magnetic field disturbance of the existing data thereon.

In a worst case scenario, the data disturbances can result in a total erasure of data in the adjacent tracks after several repetitive write operations, or data corruption upon reading. Moreover, the VCM employed in a single-stage actuation is typically subjected to a mechanical resonance at the lowest natural frequency in the range of 2000 Hz –6000 Hz due to the flexibility of the actuator arm and followed by frequencies on the suspension arm in the range of 2 kHz –15 kHz.

The response of the servo-system further limits the frequency bandwidth to less than 1500 Hz. As a result, this low frequency bandwidth imposes a severe penalty on the single-stage actuation system in such a manner that the track-seek and track-follow control is unable to rapidly and precisely respond to a change in the position of the read/write head, thus causing a significant degradation in the performance of the magnetic disk drive.

To address this technical concern, it is recognized that in order to maintain the position of the read/write head in a manner that it follows a concentric path within a narrow track width of the target data track, necessary corrections to the motion of the actuator arm are required. This provision is made possible by an enhanced track-follow control, which uses a feedback on the position error signal (PES) to make an appropriate correction to the motion of the actuator arm, so as to have the position of the read/write head follow a concentric path of the target data track within a prescribed control error allowance.

Thus, in the presence of external disturbances, variations in the position of the read/write head would not cause the position of the read/write head to significantly deviate from the target position in excess of the control error allowance. To implement this track-follow control plant, a microactuator is frequently incorporated in the control feedback loop.

Various types of microactuator have been proposed, including piezoelectric (PZT) actuators, electrostatic micro-electrical mechanical systems (MEMS), and electromagnetic microactuators. By adjusting the voltage or current supplied to the microactuator, the track-follow control makes necessary corrections to the position of the actuator arm in the presence of external disturbances, so that the read/write head follows the target data track with a predetermined degree of precision.

One such design employs a rotary co-located piezoelectric actuator attached to a hinged flexure to allow the slider to rotate upon actuation. The flexure of this design generally employs two hinged islands comprising of two rectangular paddles with two offsetting hinges. The paddles are affixed by adhesives to the piezoelectric actuator, which in turn is affixed by adhesives to the slider that contains the read/write transducer.

In principle, the piezoelectric microactuator design utilizes the physical properties of the piezoelectric material to convert an elongation or contraction of the piezoelectric material under an applied voltage to impart a force couple on the hinged islands, which, in turn, induces a rotation of the stainless steel flexure and the hence slider that contains (or supports) the read/write transducer.

Under an ideal operation, the hinged islands are designed to operate in a rotation and maintain their co-planarity during operation. In practice, however, this design may not achieve its full advantages, due to an excessive deflection of the hinged islands and the flexure.

Generally, the aerodynamic lift force generated by the ABS exerts onto the two hinged islands two reaction forces of equal magnitudes. In a like manner, the suspension gram load exerts onto the flexure at the center of rotation an equivalent reaction force. This force system causes a deflection of the flexure, resulting in a vertically downward displacement of the flexure toward to piezoelectric actuator in conjunction with a vertically upward displacement of the paddles.

The combined deflection of the flexure and the hinged islands manifests itself into a number of problems. One such problem is the resulting excessive bending stresses on the hinges, which may lead to a premature mechanical fatigue of the hinges, hence the magnetic disk drive. Another such problem is the high stress build-up in the joint bonding area between an actuator and stainless steel paddles.

Another concern with this undesirable deflection is the possible contacts between the flexure and the piezoelectric actuator under loaded condition. Frequent loading contacts may cause particulation, which is undesirable for disk drive operation.

In light of the foregoing unresolved concerns, it is recognized that an improvement to the rotary co-located microactuator-based head-gimbal assembly (HGA) design is needed. This improvement should satisfactorily resolve all the concerns without adding a further complexity to the microactuator-based head-gimbal assembly (HGA) design. Preferably, this improvement should lend itself to ease of manufacturing, which would have minimal impact on the cost of production.

SUMMARY OF THE INVENTION

It is a feature of the present invention to provide a novel enhanced rotary microactuator-based head-gimbal assembly (HGA) design for controlling the unwanted deflection of flexure. The enhanced microactuator-based head-gimbal assembly according to the present invention is designed to maintain a co-planarity of the hinged islands employed in such a microactuator under the applied load acting on the flexure and the associated hinged island components.

According to a preferred embodiment, the present invention features a novel dimple post placed at the gram loading point of the flexure tongue. The dimple post is built to the same height as the adhesive dams on the paddles of the hinged islands by a copper layer covered by a photoresist layer.

In an alternative embodiment, the dimple post may be secured to the center of the flexure tongue by means of adhesives with a variety of viscosity and elastic moduli.

In another alternative embodiment, the dimple post may be secured by means of adhesives with a variety of viscosity and elastic moduli at the center of the piezoelectric actuator surface designated for actuator-to-suspension attachment.

According to the present invention, the dimple post provides one more constraint (support) at the focal point of the loading force which offsets the two reaction forces exerted by aerodynamic lifting and gram load. Thus the hinge deformation is effectively eliminated.

The elimination of the hinge deformation affords the microactuator-based head-gimbal assembly a number of advantages, such as the increase in performance and track-follow control effectiveness resulting from the co-planarity of the hinges; and the ability to improve the performance and reliability of the read/write head.

Furthermore, the simplicity of the dimple post design requires very small modification of the existing manufacturing process for the suspensions, thus resulting in virtually no added cost of production.

BRIEF DESCRIPTION OF THE DRAWINGS

The features of the present invention and the manner of attaining them, will become apparent, and the invention itself will be understood by reference to the following description and the accompanying drawings, wherein:

FIG. 4 is a side view of the head gimbal assembly of FIG. 2, illustrating a dimple region on the flexure of FIG. 3;

FIG. 5 is an enlarged, perspective view of the flexure shown secured to the piezoelectric actuator and slider of FIG. 4;

Similar numerals in the drawings refer to similar elements. It should be understood that the sizes of the different components in the figures might not be in exact proportion, and are shown for visual clarity and for the purpose of explanation.

DETAILED DESCRIPTION OF PREFERRED EMBODIMENTS

Figure 1:
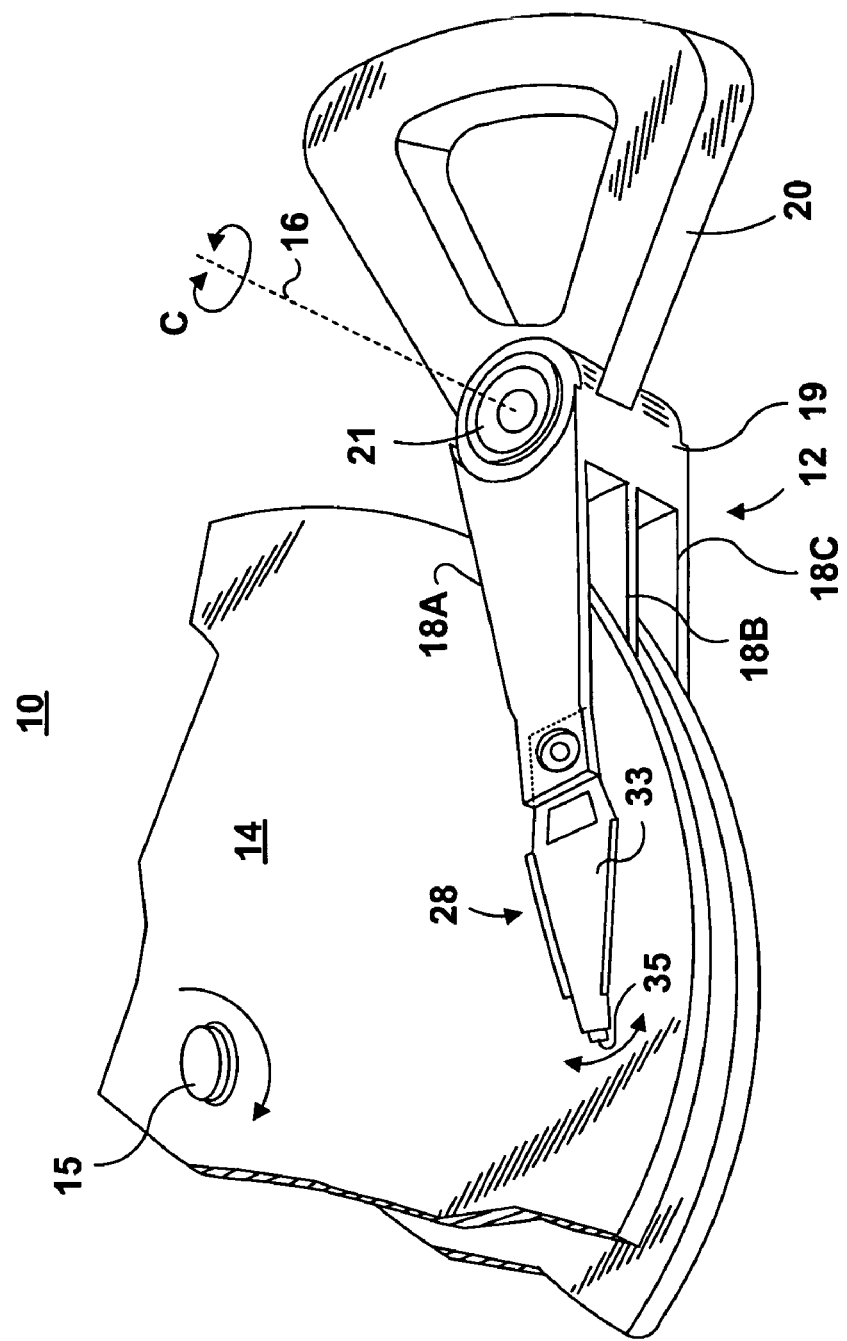
FIG. 1 is a fragmentary perspective view of a data storage system including the head gimbal assembly, made according to a preferred embodiment of the present invention.

FIG. 1 illustrates a disk drive 10 comprised of a head stack assembly 12 and a stack of spaced apart smooth media magnetic data storage disks or smooth media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor or voice coil motor (VCM) 20 attached to the block 19 in a position diametrically opposite to the actuator arms 18A, 18B, 18C. The VCM 20 cooperates with a stator (not shown) for rotating in an arc about the actuator axis 16. Energizing a coil of the rotor 20 with a direct current in one polarity or the reverse polarity causes the head stack assembly 12, including the actuator arms 18A, 18B, 18C, to rotate about the actuator axis 16 in a direction substantially radial to the disks 14.

The actuator arms 18A, 18B, 18C are generally similar in design and geometry. Therefore, only one of these actuator arms, 18A, is further referenced herein, with the understanding that this reference also applies to the plurality of the actuator arms 18A, 18B, 18C. According to a preferred embodiment of the present invention, a head gimbal assembly (H GA) 28 is secured to each of the actuator arms, for instance 18A.

Figure 2:
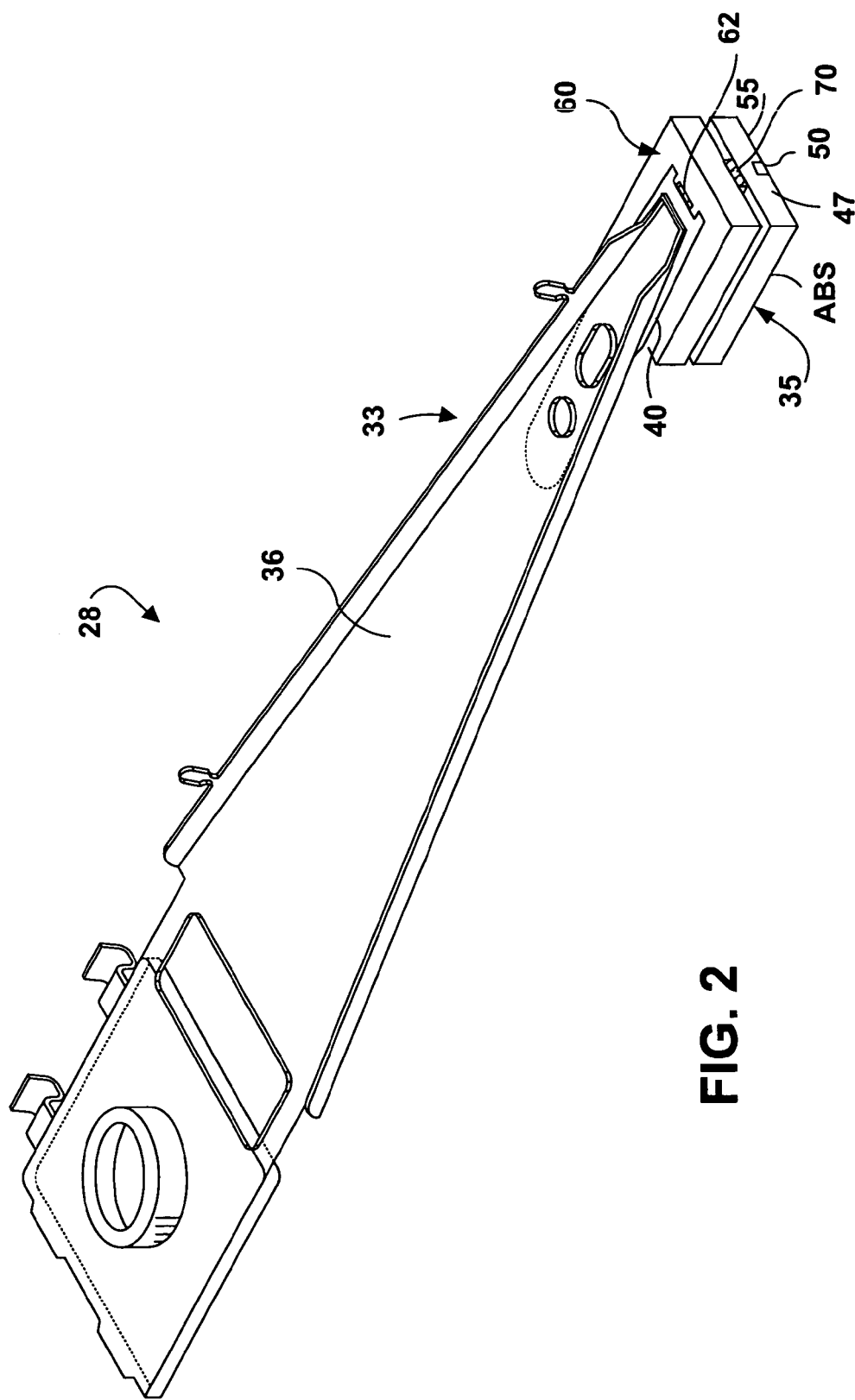
FIG. 2 is a perspective top view of the head gimbal assembly of FIG. 1 comprised of a suspension, a slider, adhesive pads, and a piezoelectric actuator, made according to the preferred embodiment of the present invention.
Figure 3:
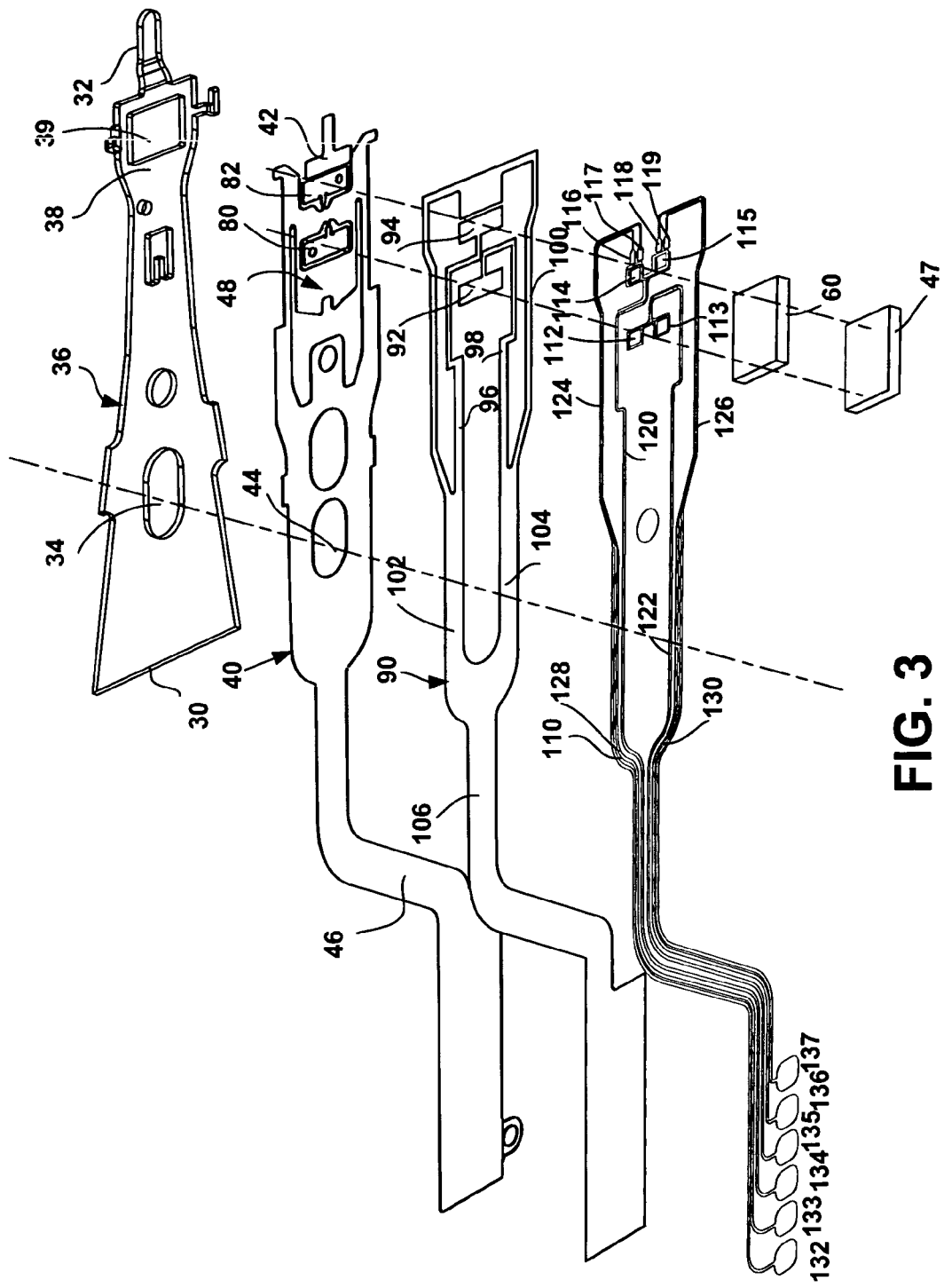
FIG. 3 is an exploded view of the head gimbal assembly of FIG. 2, illustrating a load beam, a flexure, a dielectric layer, a copper trace, a piezoelectric actuator, and a slider.

With reference to FIGS. 2 through 4, the HGA 28 includes a suspension 33, a piezoelectric actuator 60 of the present invention, and a read/write head 35. The suspension 33 includes a load beam 36 having a dimple 43 and a flexure 40. The dimple 43 is generally shaped as an inverted hemisphere with its base formed on the load beam 36 and its top pressed against the flexure 40. The top surface of the piezoelectric actuator 60 is bonded to the flexure 40 by means of a plurality of adhesive pads 62 and 64 (FIG. 4), and to a read/write head 35 on its underside via an adhesive pad 70.

The read/write head 35 is formed of a slider 47 that is secured to the piezoelectric actuator 60, and a read/write transducer 50 that is supported by the slider 47. The read/write element 50 is located at the trailing edge 55 of the slider 47 so that its forwardmost tip is generally flush with the air bearing surface (ABS) 58 of the slider 47.

With more specific reference to FIG. 3, the load beam 36 is generally flat and has an elongated shape with a taper width. The load beam 36 can assume a conventional design, with various features provided therein in the form of protuberances and cutouts that are positioned through the load beam 36 to provide connections to the flexure 40 and the actuator arm 18A. These features include, for example, a lift tab 32 and an elliptical alignment slot 34. The load arm 36 is connected to the actuator arm 18A by swaging the base plate to it.

With reference to FIG. 3, the flexure 40 is made of stainless steel and is generally flat with an elongated shape. A number of protuberances and cutouts are made throughout the flexure 40, such as a flexure tongue 48, a T-shaped forward tab 42 and an elliptical alignment slot 44. A serpentine strip 46 extends the main body of the flexure 40 to provide a surface onto which a dielectric material is deposited, conductive traces are routed, and termination pads are supported.

The flexure 40 is affixed to the underside of the load beam 36 by means of spots welding. The flexure 40 is positioned relative to the load beam 36 in a manner such that the alignment slots 34 and 44 of the load beam 36 and the flexure 40, respectively, are coincident.

The flexure 40 includes the flexure tongue 48, which, according to a preferred embodiment, has a generally rectangular shape, and is located in the forwardmost region of the flexure 40 adjacent to the T-shaped forward tab 42. The flexure tongue 48 incorporates two substantially rectangular hinged islands 80 and 82 designed to provide means for pivotally securing the piezoelectric actuator 60 to the slider 47. The details of the flexure tongue 48 will be further described in connection with FIGS. 5 to 8.

In connection with FIG. 3, a dielectric layer 90 is attached to the underside of the flexure 40. The dielectric layer 90 is composed of a conventional dielectric material such as a polyimide, to provide electrical insulation for the stainless steel flexure 40 and conductive traces 110. The dielectric layer 90 is formed on the underside of the flexure 90 by a CIS deposition method.

The dielectric layer 90 provides a layout for the electrical path to the read/write transducer 50 and piezoelectric actuator 60 to be secured thereto. Two rectangular dielectric pads 92 and 94 of the dielectric layer 90 are formed onto, or secured to the two hinged islands 80 and 82 of the flexure tongue 48, respectively.

The dielectric inner paths 96 and 98 are routed away from the forwardmost region of the dielectric layer 90 and merged with a narrow outer path loop 100 into two larger main paths 102 and 104, respectively. The two main paths 102 and 104, in turn, merge into a serpentine path 106, which conforms to the serpentine strip 46 of the flexure 40.

As further illustrated in FIG. 3, a conductive trace, such as a copper trace 110, is deposited onto the underside of the dielectric layer 90. The copper trace 110 provides the electrical connection to the read/write transducer 50 and piezoelectric actuator 60, and generally conforms to the layout of the dielectric layer 90. The copper trace 110 is comprised of six separate electrical wiring paths 120, 122, 124, 126, 128, and 130. These respective wiring paths terminate on one distal end at six corresponding termination pads 132, 133, 134, 135, 136, and 137.

The two inner electrical wiring paths 120 and 122 connect at their other distal ends to two pair of rectangular electrical wiring loops 112, 113, and 114, 115, respectively. The wiring loops 113 and 114 supply the electrical signal to the piezoelectric actuator 60. The four outer electrical wiring paths 124, 126, 128, and 130 connect at their other distal ends to four termination pads 116, 117, 118, and 119 for electrical connection to read/write sensor.

Figure 6:
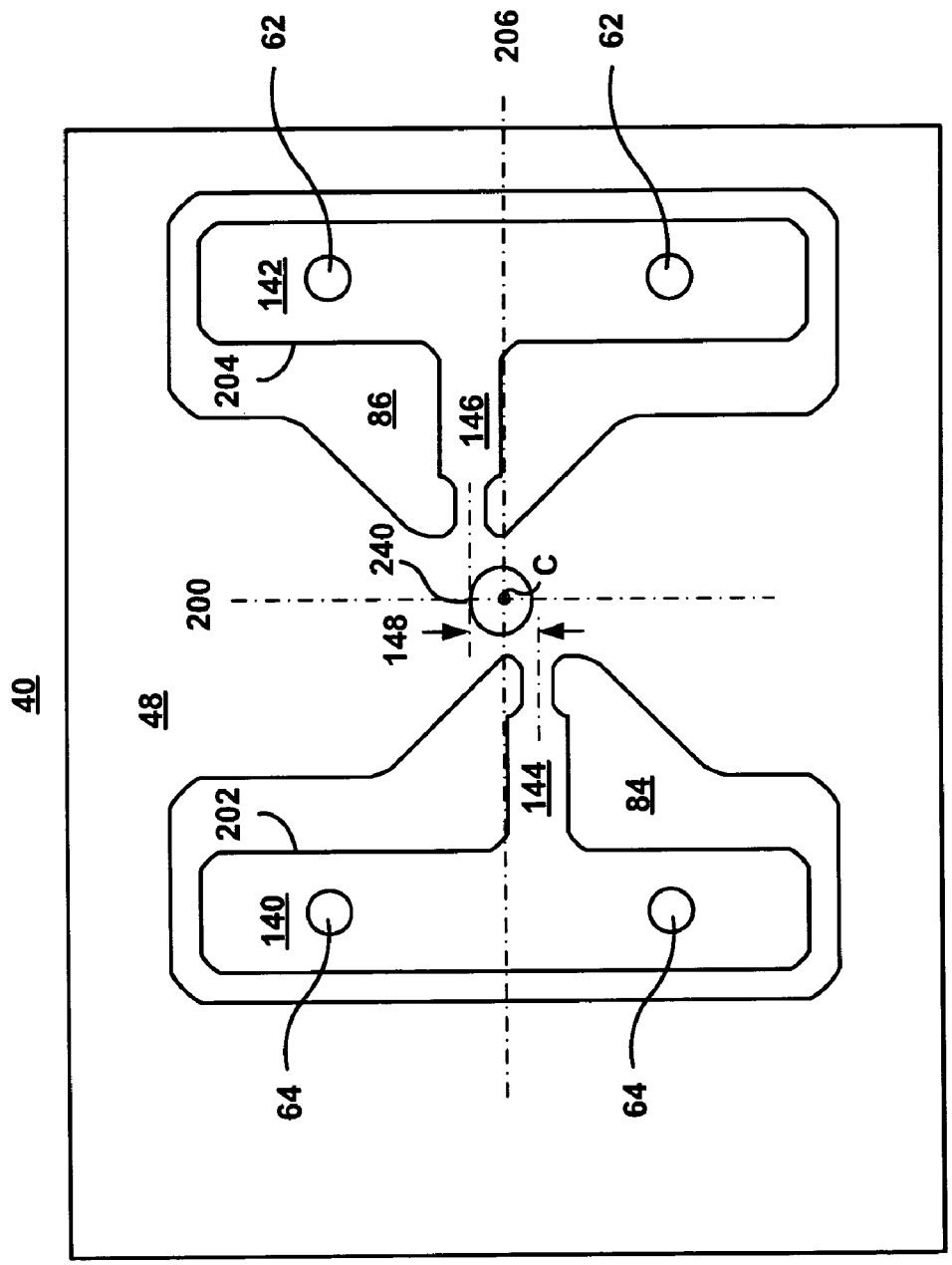
FIG. 6 is an enlarged, schematic illustration of a bottom view of a flexure tongue of the head gimbal assembly of FIGS. 2, 4, and 5, illustrating two adhesive pads bonded to two hinged islands of the flexure tongue that are made according to a preferred embodiment of the present invention.

Referring now to FIGS. 5 and 6, the tongue 48 of the flexure 40 has a substantially rectangular shape, and is located in the forwardmost region of the flexure 40. The flexure tongue 48 includes two hinged islands 80 and 82 that are formed by, and separated from the main body 85 of the flexure tongue 48 by two narrow gaps 84 and 86, respectively.

The gaps 84 and 86 are generally similar in design, and have the shape of the letter G, to enclose the hinged islands 80 and 82 in part. The dimensions of the gaps 84, 86 are such that they allow rotation of the hinged islands 80 and 82 therewithin.

As more clearly illustrated in FIG. 6, the hinged islands 80 and 82 are generally disposed opposite to each other relative to a dimple region 240 located at a center of symmetry C, at which a transverse axis 200 and a longitudinal (or axial) axis 206 intersect. The dimple is formed on the loadbeam. The dimple region 240 is designed to permit the dimple on the suspension arm 36 to make contact with the flexure tongue 48 at the center of symmetry C.

In FIG. 6, the flexure tongue is schematically represented by a rectangular borderline to simplify the description of the hinged islands 80 and 82. The hinged islands 80 and 82 are defined by two tabs (or paddles) 140 and 142, and two elongated hinges 144 and 146, respectively. Though the tabs 140 and 142 are shown to be generally rectangularly shaped, it should be clear that they can assume any other suitable shape.

The tabs 140 and 142 are generally similar in shape and construction, and provide bonding surfaces for attaching the piezoelectric actuator 60 (FIG. 5) by means of the adhesive pads 62 and 64 (FIG. 4), respectively. In the embodiment illustrated herein, the tabs 140 and 142 are generally oriented along the transverse axis (or direction) 200, and have the following approximate dimensions: 1 mm in length and 0.3 mm in width.

The tabs 140 and 142 are further separated by a distance of approximately 0.7 mm, from the inner edge 202 of the tab 140 to the inner edge 204 of the tab 142. The two hinges 144 and 146 are formed of thin, short, substantially shouldered (stepped) rectangular sections that protrude from the inner edges 202 and 204 of the tabs 140 and 142, respectively, and generally extend along the longitudinal axis 206 of the flexure 40. Furthermore, the two hinges 144 and 146 are offset by a distance 148 along the transverse axis 200. The offset 148 is designed to enable the hinged islands 80 and 82 to freely rotate within the gaps 84 and 86 during a track-follow control actuation.

Figure 7:
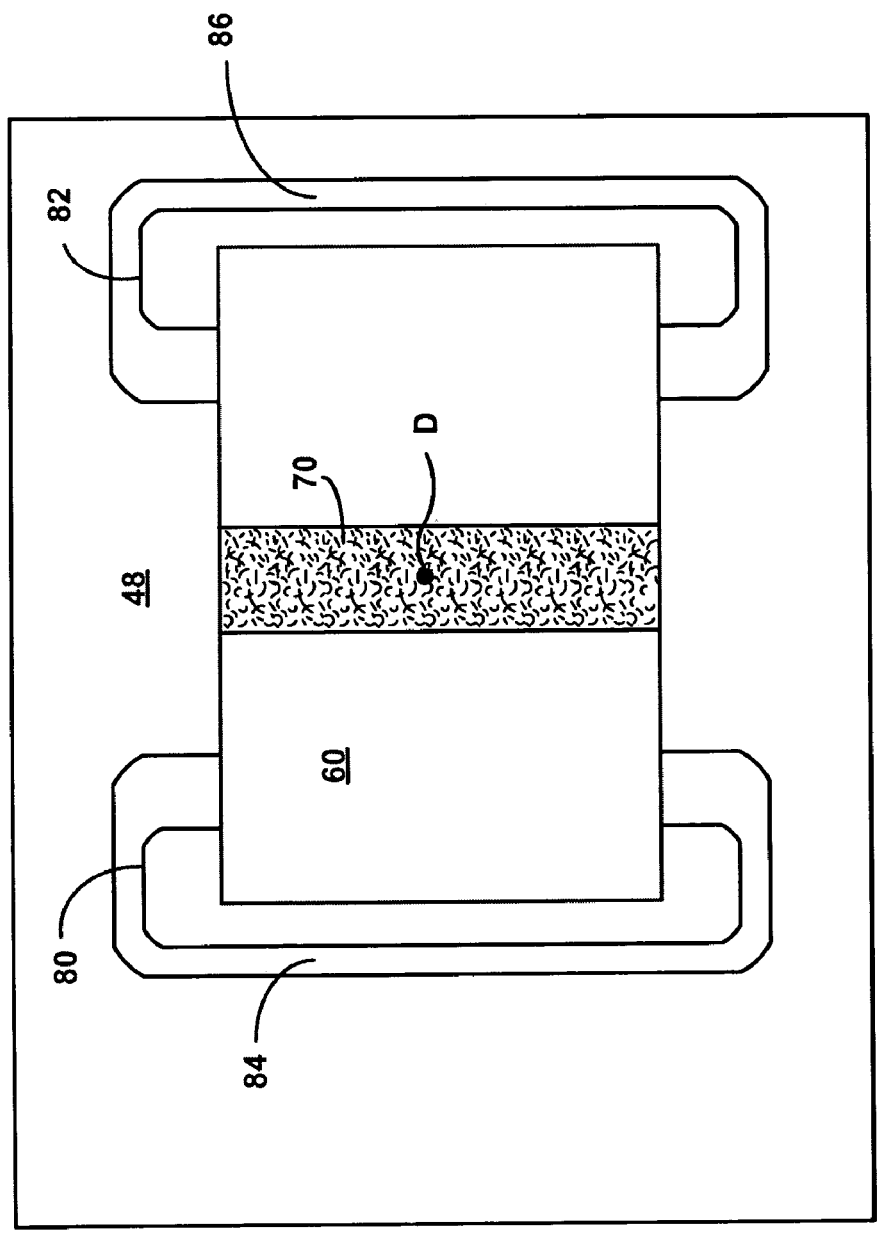
FIG. 7 is a bottom view of the piezoelectric actuator shown bonded to the flexure tongue and an adhesive pad, for bonding the slider of the head gimbal assembly of FIG. 2 to the piezoelectric actuator.
Figure 8:
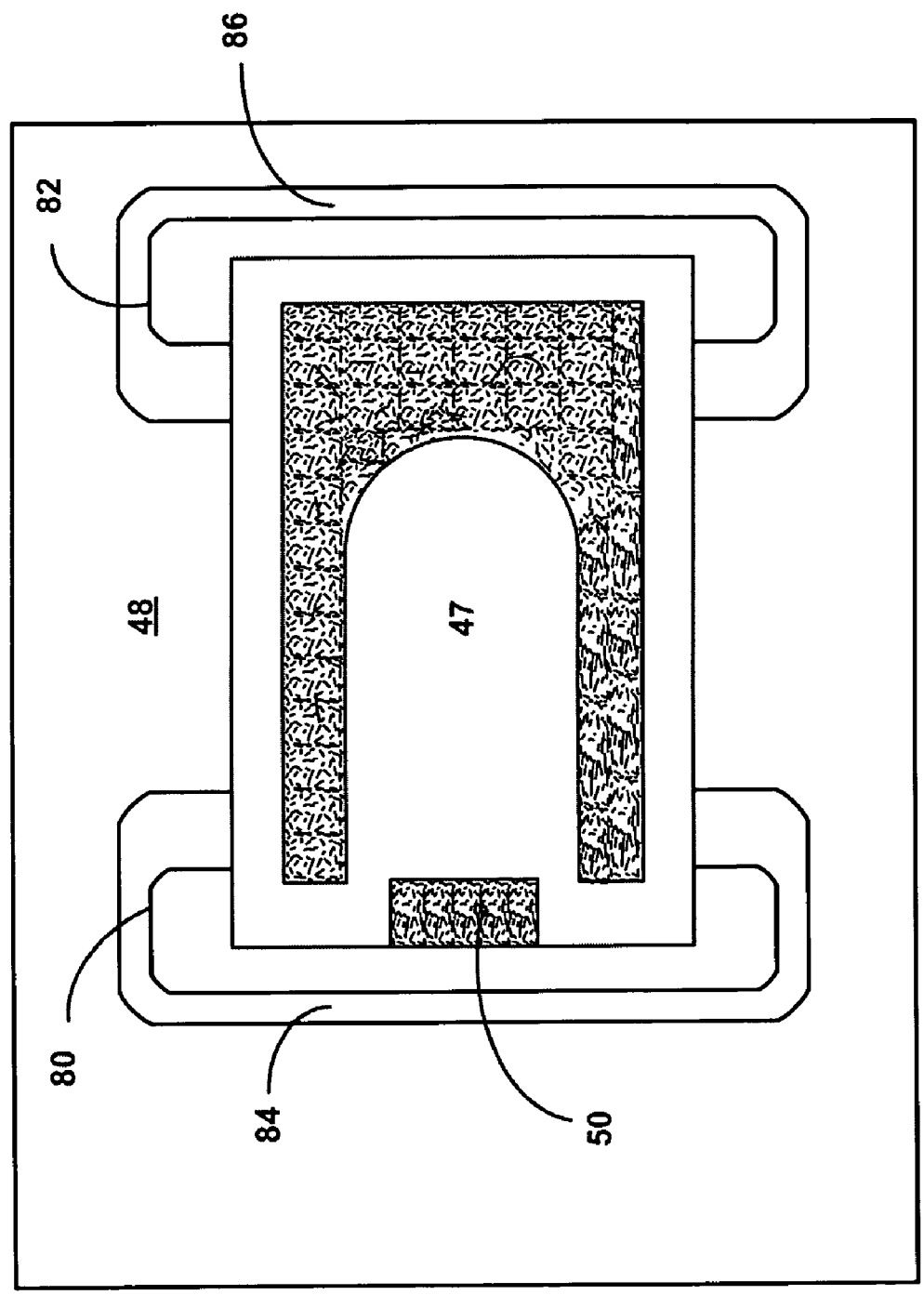
FIG. 8 is a bottom view of the slider shown bonded to the piezoelectric actuator of FIG. 7.

With reference to FIGS. 7 and 8, the piezoelectric actuator 60 has a generally rectangular shape that is preferably, but not necessarily, similar in dimensions to those of the slider 47. The piezoelectric actuator 60 is positioned relative to the flexure tongue 48, such as its length extends along the longitudinal axis 206 of the flexure 40 and its center D is accurately aligned with the center of symmetry C of the flexure tongue 48 (FIG. 6). The piezoelectric actuator 60 is preferably, but not necessarily made of PZT material or any other similar material, and can be of either a bulk type or a multi-layer type.

A bulk-typed piezoelectric actuator 60 is formed by co-firing the molded piezoelectric single crystals, while a multi-layer typed piezoelectric actuator 60 is comprised of a number of stratified sections of piezoelectric material that are superimposed to form a desired thickness of the piezoelectric actuator 60. Reference is made for example, to U.S. Pat. No. 6,246,552 for further composition details, which is incorporated herein by reference.

In certain applications, the multi-layer typed piezoelectric actuator 60 is preferred over the bulk-typed piezoelectric actuator 60 due to its low driving voltage requirement, since a larger electric field can be generated if voltages are applied to thinner layers, with the stroke being proportional to the electric field. The electrical contacts to the piezoelectric actuator 60 are provided by the rectangular pads 113 and 114 (FIG. 3), for supplying a controlled voltage as defined by the control system.

The piezoelectric actuator 60 is attached to the flexure tongue 48 by means of the adhesive pads 62 and 64 (FIG. 6), which are positioned against the rectangular tabs 140 and 142 of the respective hinged islands 80 and 82. The backside of the slider 47 is then affixed against, or secured to the bottom surface of the piezoelectric actuator 60, by means of an adhesive pad (or pads) 70.

Figure 9:
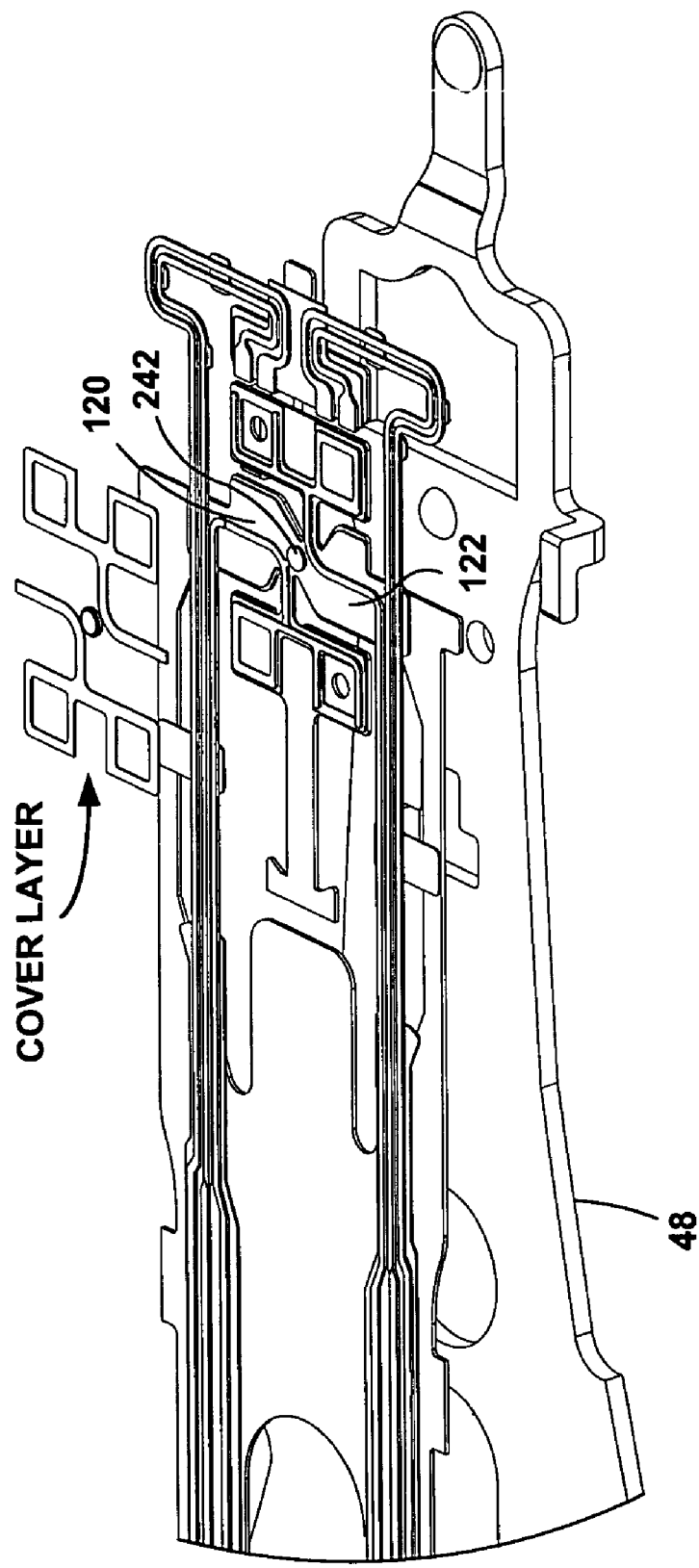
FIG. 9 is an exploded view of the flexure tongue of FIG. 3 shown with the electrical copper trace that forms a dimple post in accordance with the preferred embodiment.

Referring now to FIG. 9, it illustrates a preferred embodiment of the present invention, wherein a dimple post 242 is formed in the dimple region 240 of the flexure tongue 48 at the center of symmetry C, by, for example, branching one of the electrical wiring traces 120 or 122 to this region. In particular, FIG. 9 shows an electrical wiring branch 244 emerging from the wiring trace 122 at a junction 246. The branch is routed and terminated at the center of symmetry C with the dimple post 242. It should be understood that the dimple post 242 may alternatively be formed by branching the electrical wiring trace 120.

The dimple post 242 of the preferred embodiment is generally shaped as a raised circular pad. Alternatively, the dimple post 242 may also be formed of any other cross sectional shape as suited for a particular application.

Figure 10:
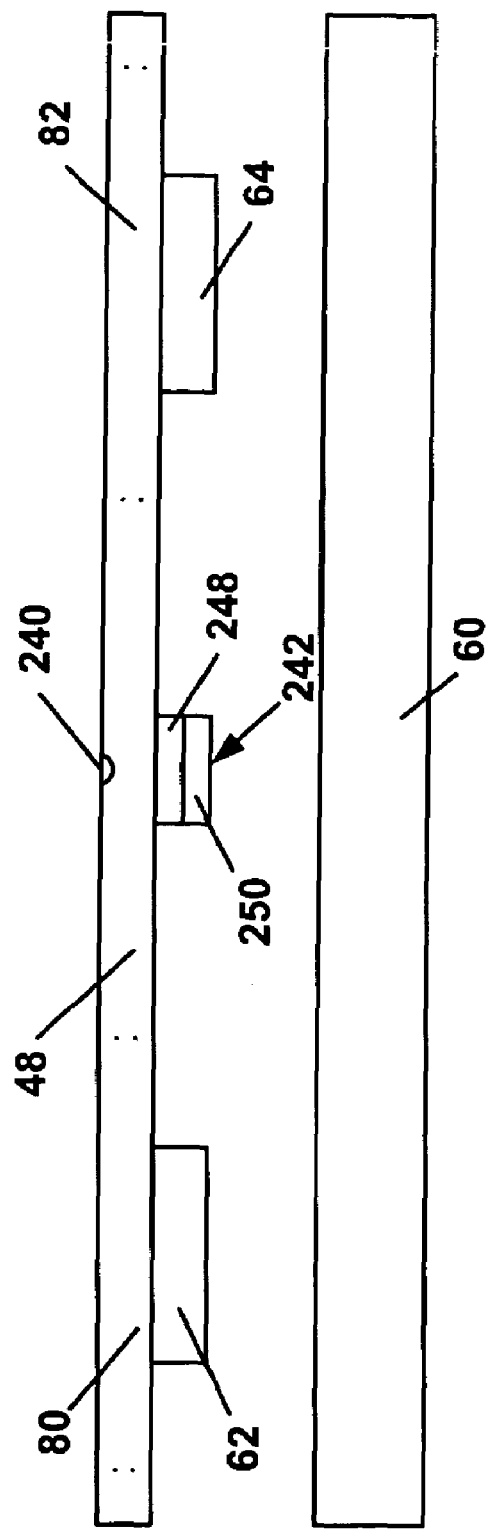
FIG. 10 is a cross sectional view of the flexure, illustrating the dimple post of FIG. 9 comprising of a copper layer and a cover layer made according to the preferred embodiment.

With reference to FIG. 10, the dimple post 242 is comprised of an underlying copper layer 248 that is part of the electrical wiring branch or trace shown in FIG. 9, and a cover layer 250. The cover layer 250 is deposited on top of the copper layer 248 and is usually made of a liquid or dry film photoresist material. It should be understood that the underlying layer 248 and the cover layer 250 can also be made of any other suitable material without departure from the teaching of the present invention.

With further reference to FIG. 10, the top of the cover layer 250 is formed to approximately the same height as the adhesive pads 62 and 64. According to a preferred embodiment, the radius and the height of the dimple post 242 may range, for example, between approximately 0.06 mm and 0.012_mm, respectively. These dimensions can be accurately controlled in order to achieve a desirable performance of the microactuator 60.

Figure 11:
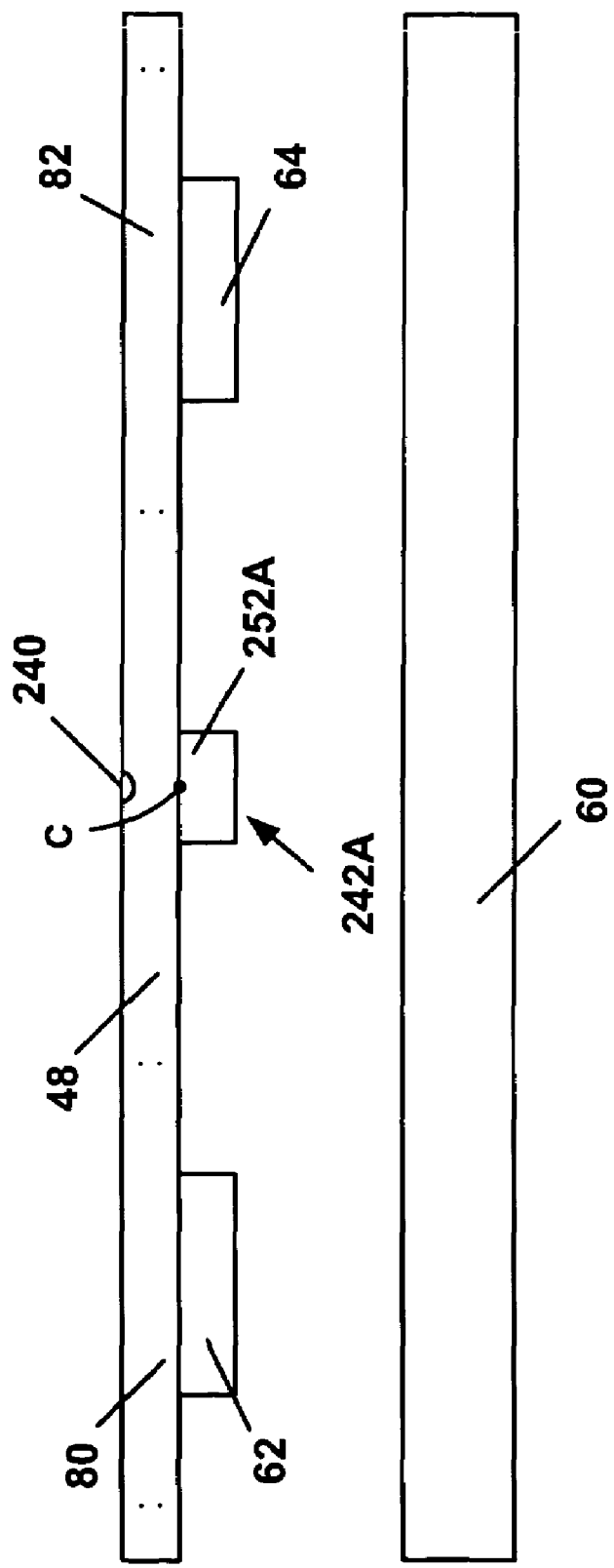
FIG. 11 is a cross section view of the flexure tongue of FIG. 3 illustrating alternate embodiment A, wherein the dimple post is formed by an adhesive dot on the flexure tongue.

Referring now to FIG. 11, it illustrates an alternative embodiment of the present invention according to which the dimple post 242A may be formed of a layer 252A by dispensing a suitable material, such as adhesives, with different viscosities and elastic moduli onto the dimple region 240 of the flexure tongue 48, at the center of symmetry C. The dimple post 242 may be formed of a similar geometry as that of FIG. 10. The adhesive may be dispensed through a needle syringe, only one layer is preferably dispensed and cured. Different viscosity adhesives provide a control over the adhesive dot height. For example, an adhesive with high viscosity will give a higher dimple post than that with a low viscosity.

Figure 12:
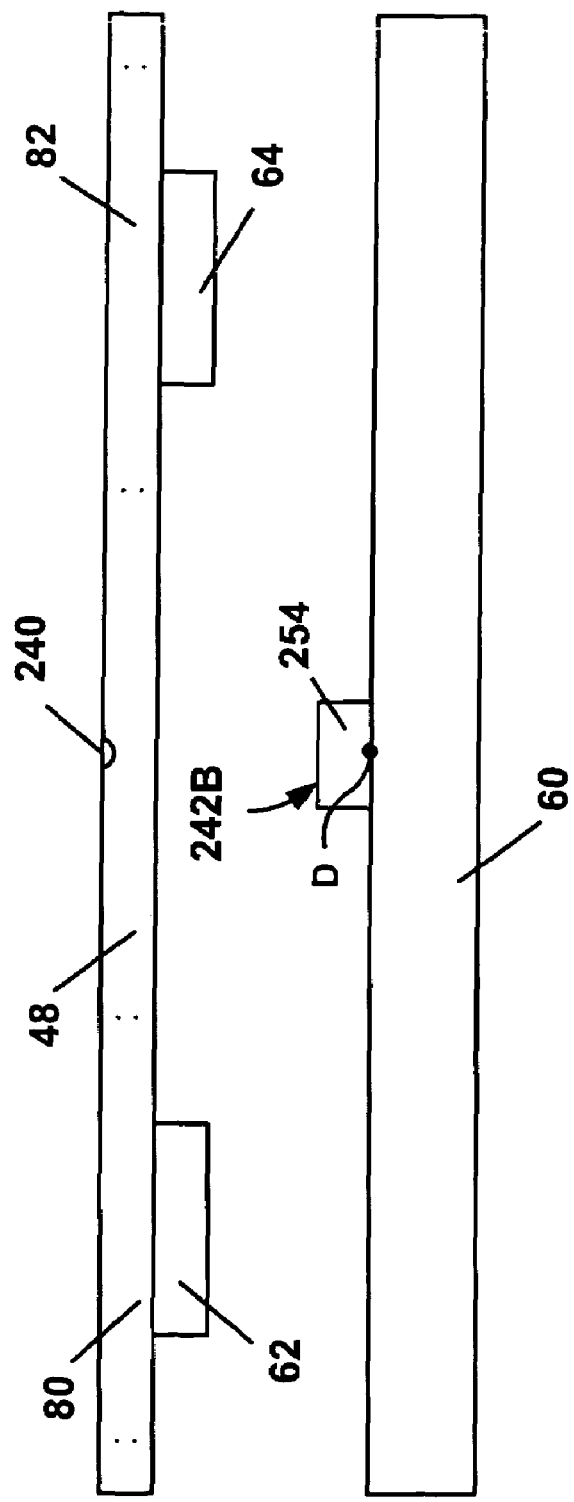
FIG. 12 is a cross sectional view of the flexure tongue and piezoelectric actuator of FIG. 3 illustrating alternate embodiment B, wherein the dimple post is formed by an adhesive dot on the piezoelectric actuator.

FIG. 12 illustrates an alternative embodiment of the present invention, wherein a dimple post 242B may be formed of a layer 254, by dispensing a suitable material, such as adhesives with different viscosities and elastic moduli onto the center D of the piezoelectric actuator 60. The dimple post 242B may have a similar geometry as that of FIGS. 10 and 11.

The dispensed adhesive layers 252A (FIG. 11) and 254 (FIG. 12) may be cured thermally or through UV light to provide a certain structural integrity with different mechanical properties including certain damping characteristics to provide a vibrational attenuation of the hinged islands 80 and 82 during actuation.

In order to provide a clearer appreciation of the advantages afforded by the present invention, the functionality of the dimple posts 242, 242A, and 242B (hereinafter collectively referred to as "242") is further described in details in connection with FIGS. 13 to 16.

Figure 13:
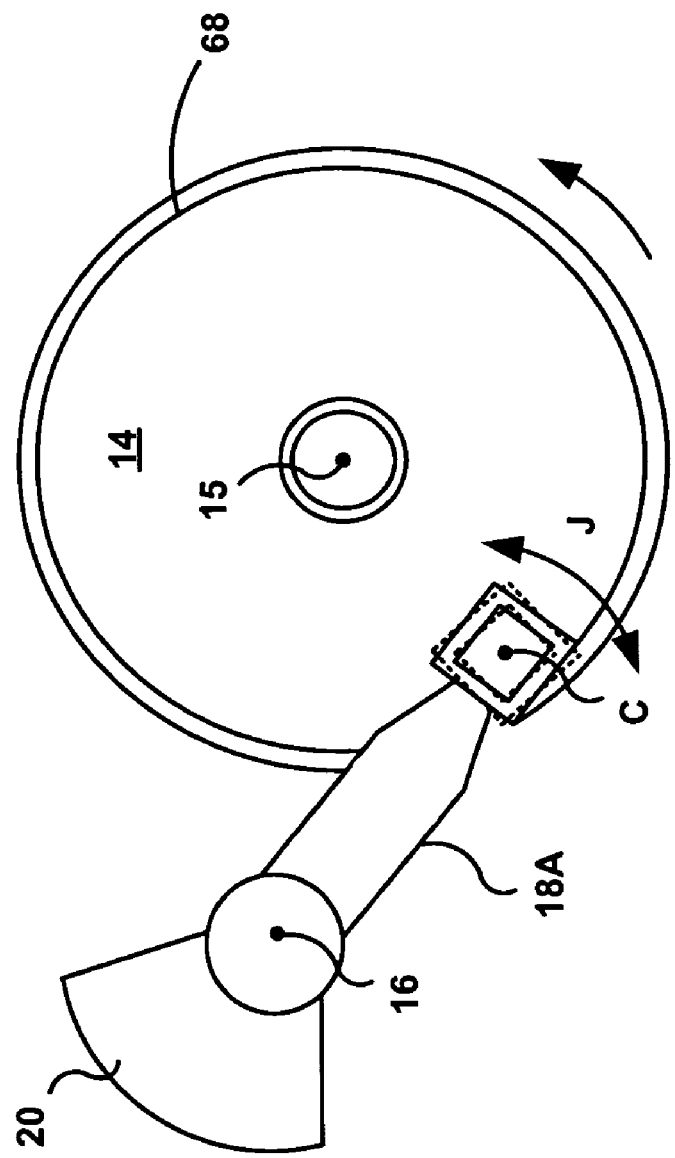
FIG. 13 is a bottom view of the head gimbal assembly of FIG. 2 before and after actuation.

During a track-seek control, the actuator arm 18A is driven by the voice coil actuator 20 to provide a coarse positioning of the read/write head 35 by pivoting about a pivot bearing, around the axis 16 (FIGS. 1 and 13). Upon arriving at a desired target data track 68, the track-follow control assumes the primary function of the magnetic disk drive 10 by causing the read/write head 35 to follow the target data track 68 in a high resolution mode, which is also known as fine positioning.

A feedback control system is deployed by means of an embedded logic to enable the track-follow control function. The track-follow control system senses the deviation in the position of the read/write head 35 relative to the track position. A correction is made to reduce this deviation by the track-follow control, which commands a necessary voltage to the piezoelectric actuator 60 to cause it to rotate along with the slider 47, thus restoring the desired position of the read/write head 35.

This operation is illustrated in FIG. 13. In particular, FIG. 13 shows that the correction requires a counterclockwise rotation of the slider 47 as viewed from the ABS, with the understanding that a clockwise rotation may alternatively be required as suited for a particular position of the read/write head 35.

Figure 14:
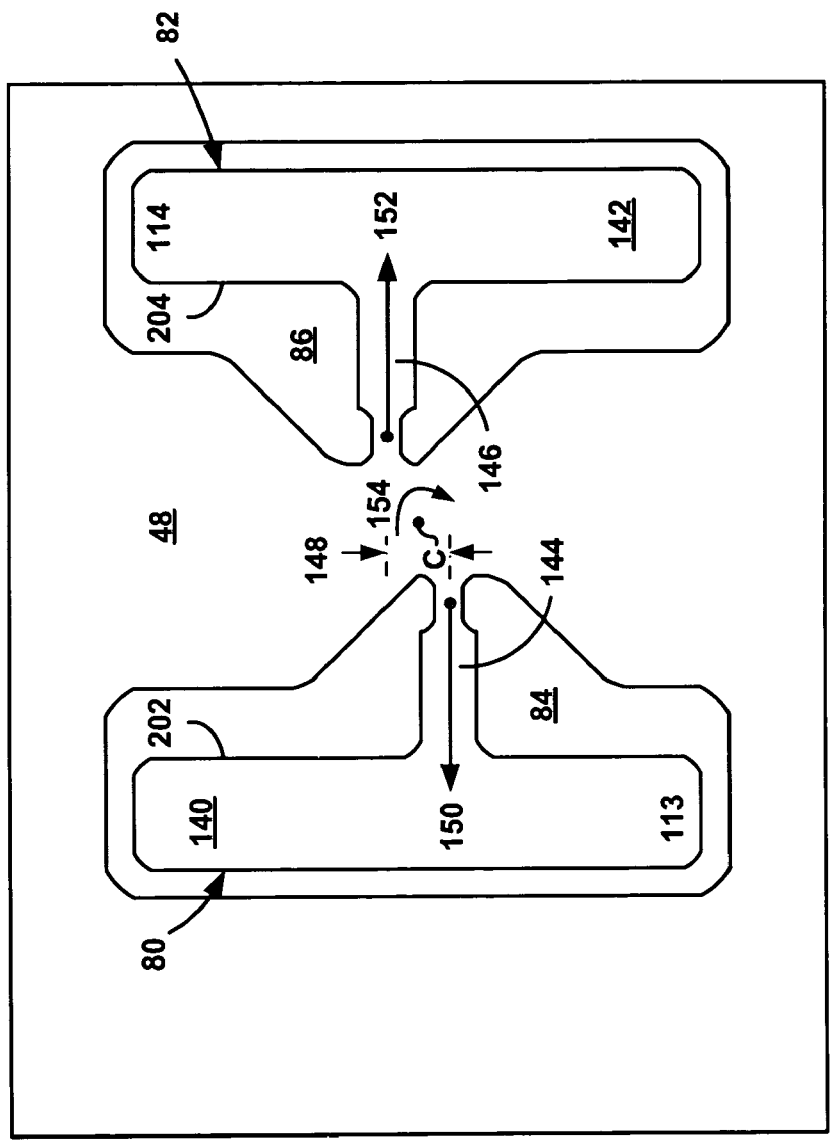
FIG. 14 is a bottom view of the hinges and the piezoelectric actuator during a track-follow control actuation, shown with a corresponding force diagram.
Figure 15:
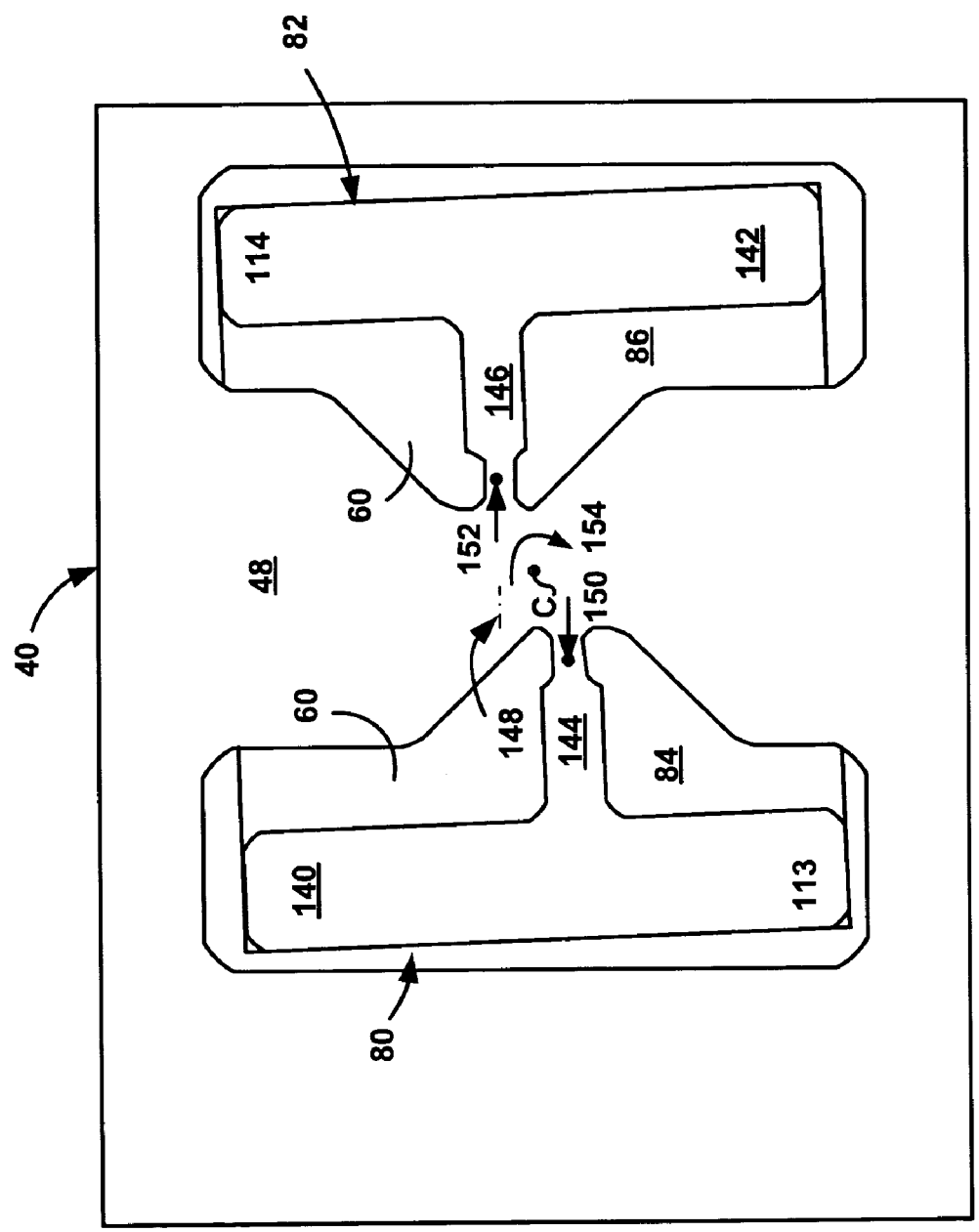
FIG. 15 illustrates a bottom view of the displaced hinges and piezoelectric actuator after actuation.
Figure 16:
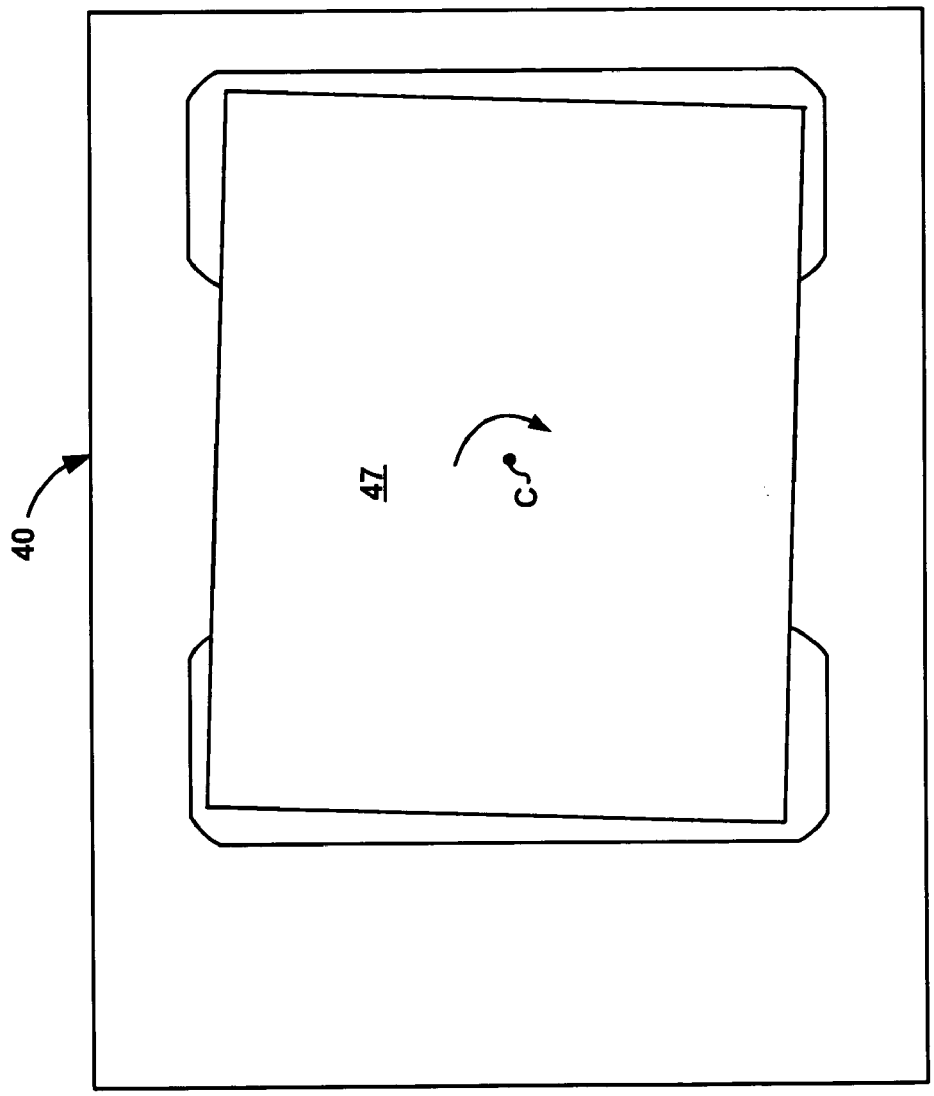
FIG. 16 is an ABS view of the slider of FIG. 3, shown in a rotational movement, secured to the piezoelectric actuator of FIG. 11.

With reference to FIGS. 14 through 16, when a control voltage is applied to the piezoelectric actuator 60 through the pads 113 and 114 the piezoelectric actuator 60 deforms, i.e., changes shape, according to the polarity of the voltage. As the length of the piezoelectric actuator 60 elongates or shortens, the piezoelectric actuator 60 exerts forces 150 and 152 on the two hinges 144 and 146, respectively. In the presence of the offset 148, the forces 150 and 152 on the two hinges 144 and 146, which are substantially equal and opposite in direction, impart a force couple 154 onto the flexure tongue 48. Since the flexure tongue 48 is largely fixed compared to hinged islands 140 and 142, the force couple 154 causes the hinge 144 and 146 to deflect and rotate the paddles 140 and 142 with the actuator 60 and the slider attached on them about the center of rotation C.

In an ideal actuation, the hinged islands 80 and 82 are designed to remain co-planar and to rotate freely without any physical interference between the flexure tongue 48 and the piezoelectric actuator 60. The ability to achieve the planarity of the hinged islands 80 and 82 is primarily enabled by the dimple post 242.

Figure 17:
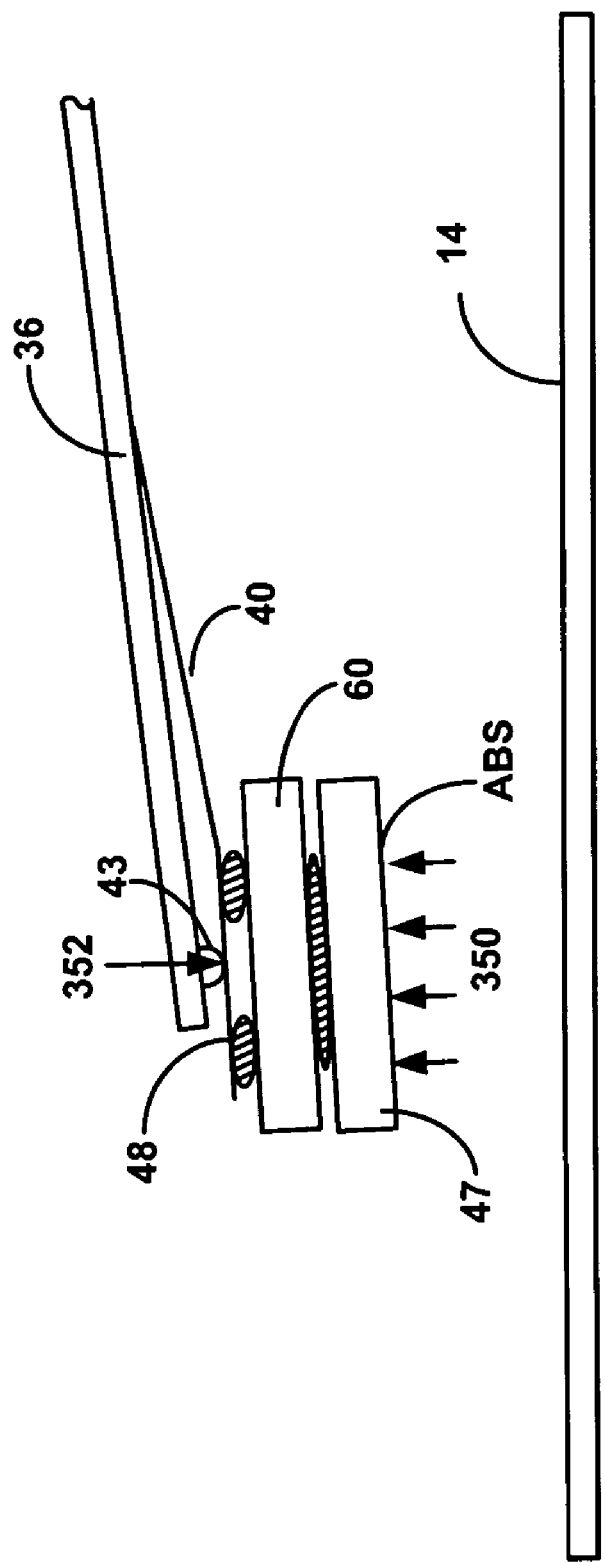
FIG. 17 illustrates forces applied on the slider-suspension assembly of FIG. 2.

With reference to FIG. 17, during a typical operation, the slider 47 on which the read/write transducer 50 is mounted is flying over the spinning magnetic storage disk 14. The rapid rotation of the magnetic storage disk 14 generates a sufficient differential pressure between the top and bottom of the slider 47, which is also the ABS 58, to create a distributed lift force 350 acting at the center of the ABS 58 that causes the slider 47 to become airborne. In order to maintain the slider 47 in a static equilibrium, the suspension arm 36 exerts a suspension gram load 352 equal and opposite to the lift force 350 onto the flexure tongue 48 via the dimple 43.

Figure 18:
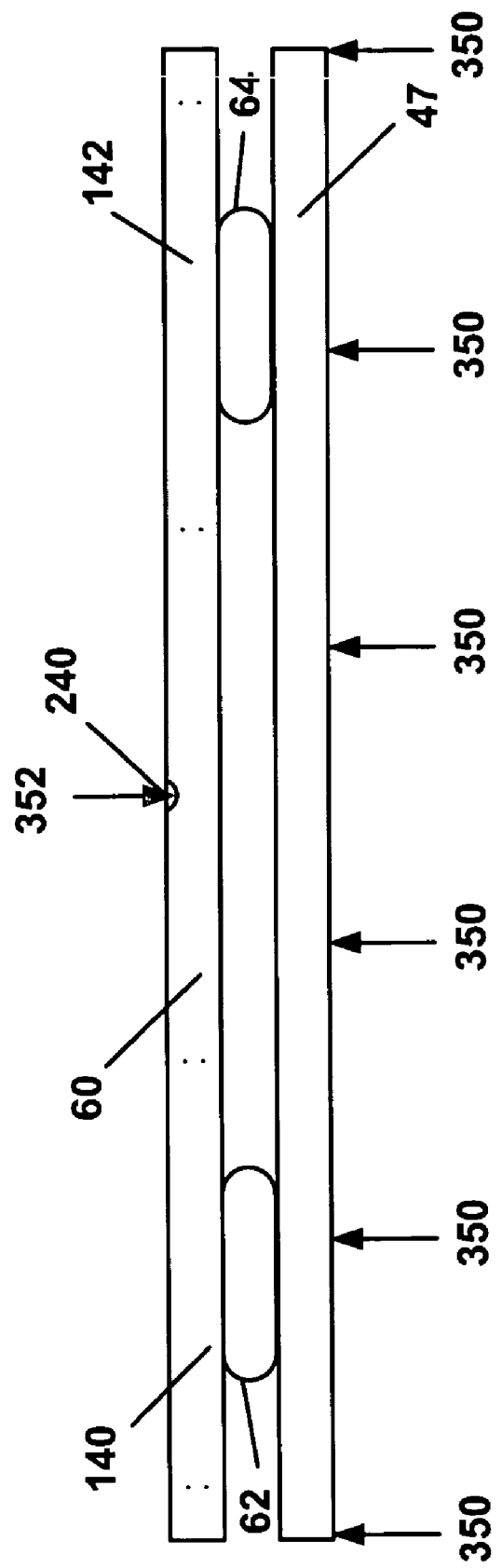
FIG. 18 is a force diagram of the flexure tongue of FIG. 10 without the dimple post of FIG. 9.

The advantages of the dimple post 242 may be further illustrated by considering the microactuator design without such a dimple post 242. With reference to FIG. 18, in the absence of the dimple post 242, the lift force 350 is transmitted to the adhesive pads 62 and 64, creating reaction forces acting in opposite direction to the lift force 350. The reaction forces fully bear onto the two paddles 140 and 142 while the suspension gram load 352 is acting on the flexure tongue 48 in the dimple region 240. Thus, the flexure tongue 48 is loaded in a two-point support bending arrangement. This loading arrangement creates the greatest displacement at the center of symmetry C of the flexure tongue 48.

Figure 19:
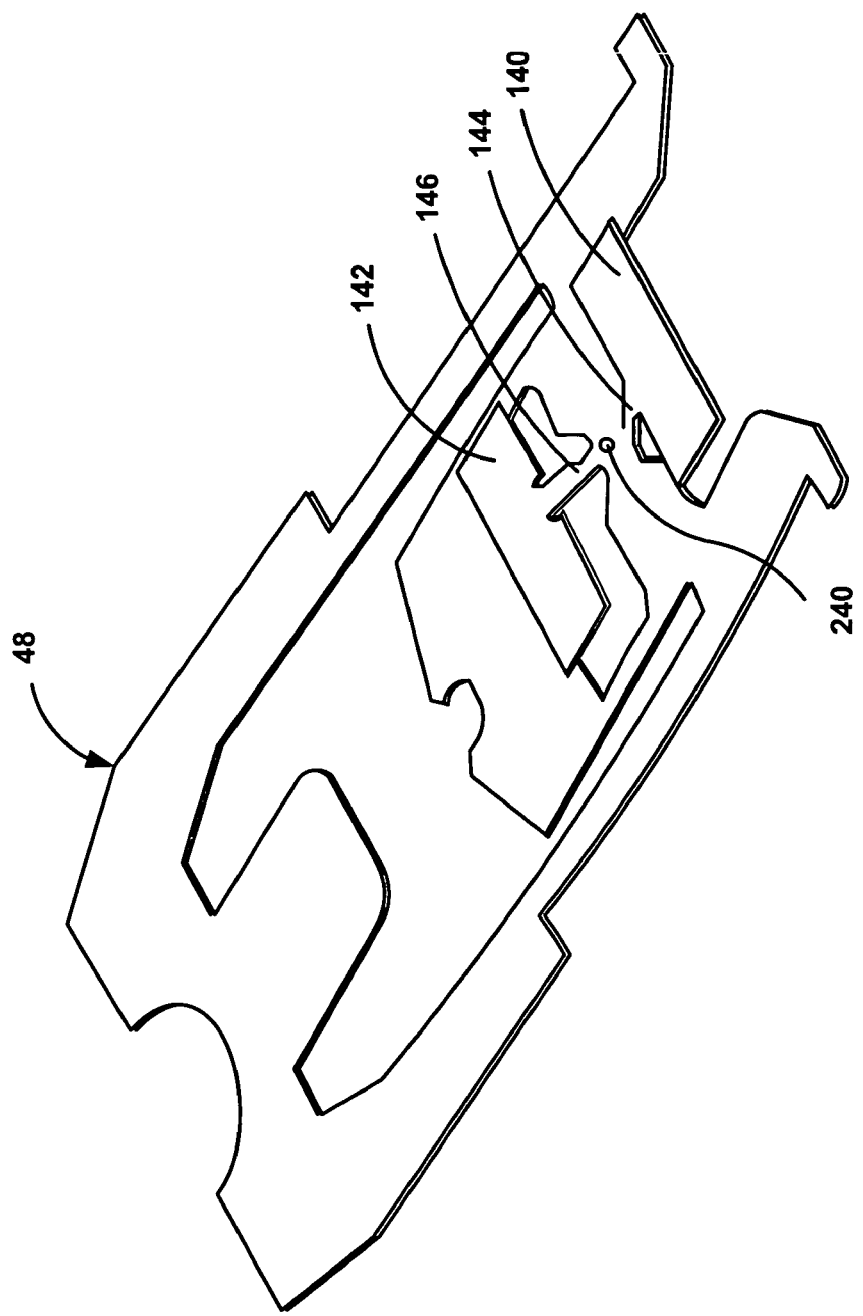
FIG. 19 illustrates a bottom view of a three-dimensional deflected shape of the flexure tongue and hinged islands without the dimple post of FIG. 9 due to the applied forces of FIG. 18.

With further reference to FIG. 19, in the absence of the dimple post 242, the reaction forces consequently cause a vertically upward, out-of-plane deflection of the two hinged islands 80 and 82. This vertically upward deflection further displaces the piezoelectric actuator 60 in a closer proximity to the flexure tongue 48. Moreover, the suspension gram load 352 presses the flexure tongue 48 vertically downward toward the piezoelectric actuator 60. Consequently, the combination of the upward deflection of the hinged islands 80 and 82 to which the piezoelectric actuator 60 is attached and the downward deflection of the flexure tongue 48 therefore results in high bending stresses in the hinges 144 and 146 and further poses as a source of physical interference, or rubbing, between the flexure tongue 48 and the piezoelectric actuator 60.

Based on a finite element simulation, the resulting bending stresses in the hinges 144 and 146 when the dimple post 242 is not present on the flexure tongue 48 can be in excess of 307 MPa, which is approximately about 25% of the yield strength of a typical stainless steel material for the flexure tongue 48. As a result, the high bending stresses in the hinges 144 and 146 may cause a premature failure of the microactuator-based slider 47, thus shortening the product life of the magnetic disk drive 10.

Figure 20:
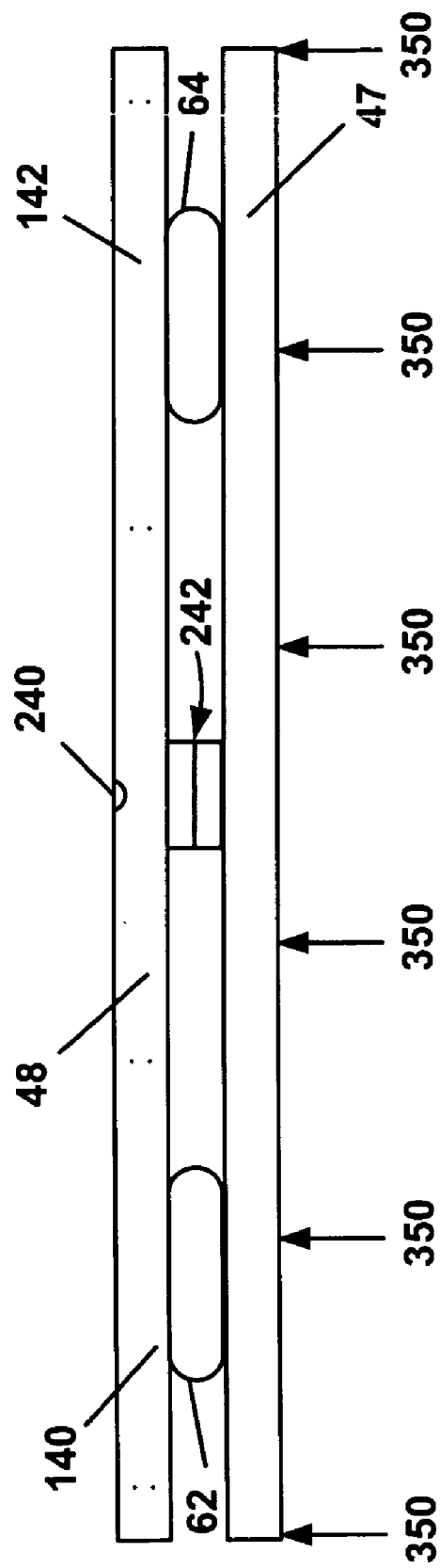
FIG. 20 is a force diagram of the flexure tongue of FIG. 10, illustrating a three-point support in the presence of the dimple post of FIG. 9.

It is therefore recognized that the dimple post 242 provides a number of advantages to overcome the problems with the microactuator-based slider 47 without the dimple post 242. FIG. 20 illustrates a force diagram of the flexure tongue 48 in the presence of the dimple post 242. As was with the case without the dimple post 242, the adhesive pads exert two reaction forces onto the two paddles 140 and 142 to react the lift force 350. The suspension gram load 352 from the suspension arm 36 is transmitted onto the dimple post 242 and subsequently to the piezoelectric actuator 60.

Because the dimple post 242 is at the same level as the adhesive pads 60 and 62, the flexure tongue 48 are supported at three points versus the two-point simple support as in the case without the dimple post 242. This three-point support thus minimizes the deflection of the hinged islands 80 and 82 due to the increased flexural rigidity of the three-point support, and virtually eliminates the deflection at the center of symmetry C of the flexure tongue 48. The bending stresses in the hinges 144 and 146 are thus substantially reduced, thus resulting in an enhanced product life of the magnetic disk drive 10 as the hinges 144 and 146 become less prone and susceptible to premature mechanical fatigue failure due to excessive bending stresses. Meanwhile, the dimple post 242 ensures the near planar condition of the flexure tongue 48 and the hinged islands 80 and 82. The microactuator will have the best performance under such condition. Therefore, tighter yaw frequency tolerance and higher stroke sensitivity can be obtained.

Another feature of the microactuator-based slider 47 associated with the dimpled post 242 is the near planar condition of the flexure tongue 48 and the hinged islands 80 and 82. This co-planarity ensures that unwanted motions of the piezoelectric actuator 60 is suppressed, thus preventing potentially serious problems of side-writing and accidental data erasing (parallel to side-writing) on the adjacent tracks.

The implementation of the dimple post 242 can be adapted into a typical manufacturing process with a great ease. As an example, the dimple post 242 of the preferred embodiment can be manufactured simply by slightly changing the photo mask process that defines the various electrical copper traces including the traces 120 and 122. The photoresist cover layer 250 can be included in one of the already available manufacturing sequences. As for dimple posts introduced by adhesives, these dimple post forming can be done either at HGA assembly to dispense and cure an adhesive to suspensions or at slider fabrication facility to pre-bump adhesive dimple post to actuators. The manufacturing ease associated with the dimple post 242 effectively result in little added cost to the production of such microactuator-based sliders 47. Therefore, a competitive advantage is realized by the novelty of the dimple post 242 concept of the present invention.

It should be understood that the geometry, compositions, and dimensions of the elements described herein can be modified within the scope of the invention and are not intended to be the exclusive; rather, they can be modified within the scope of the invention. Other modifications can be made when implementing the invention for a particular environment. As an example, while the various actuators have been described herein to be comprised of piezoelectric material, it should be clear that other active materials, such as, electrostrictive material, memory alloy, smart material, and so forth, could alternatively be employed.

What is claimed is:

1. A head for use in a data storage device, comprising:
   a resilient hinged mounting structure having a center and at least two hinged islands;
   a slider coupled to the mounting structure with two spaced apart adhesive pads;
   a dimple post formed on the mounting structure about the center and interposed between, but spaced apart, from the two adhesive pads; and
   a conductive path and a dam on each of the adhesive pads that are formed on each of the hinged islands;
   wherein the dam on each pad comprises an adhesive dam having a height, wherein the heights of the dams on the hinged islands are substantially equal, and wherein the dimple post has a height that is substantially equal to the height of the dams, whereby the dimple post abuts the slider.

2. The head of claim 1, wherein the center is a center of the loading force of the mounting structure.

3. The head of claim 2, wherein the mounting structure comprises a flexure tongue.

4. The head of claim 3, wherein the flexure tongue comprises the at least two hinged islands and the at least two hinged islands are generally disposed opposite to each other relative to the center of the mounting structure; and
   wherein the at least two hinged islands are secured directly to the slider with the spaced apart adhesive pads.

5. The head of claim 4, further comprising a microactuator that is interposed between the slider and the flexure tongue: and
   wherein the two hinged islands are secured directly to the microactuator.

6. The head of claim 1, wherein the dimple post comprises a conductive layer.

7. The head of claim 6, wherein the dimple post further comprises a photoresist layer that covers, at least in part, the conductive layer.

8. The head of claim 1, wherein the dimple post comprises an adhesive dot.

9. The head of claim 8, wherein the dimple post comprises a plurality of adhesives having a variety of elastic moduli, ranging from soft to rigid.

10. The head of claim 1, wherein the dimple post is formed about the center of the mounting structure to maintain a co-planarity of the mounting structure under a loading load that is applied onto the dimple post.

11. The head of claim 1, wherein the center of the mounting structure coincided with a center of gravity of the slider.

12. The head of claim 1, wherein the center of the mounting structure coincides with a center of force of the slider.

13. The head of claim 1, further comprising an actuator that includes a top side and an underside, and that moves rotationally about a center of rotation, to perform fine positioning movement when a control voltage is applied to the actuator; and wherein the center of rotation is generally co-linear with the center of the hinged mounting structure.

14. The head of claim 13, wherein the top side of the actuator is secured to the hinged mounting structure.

15. The head of claim 14, wherein the underside of the actuator is secured to the slider.

16. The head of claim 14, wherein the actuator includes a piezoelectric actuator.

17. A head gimbal assembly for use in a data storage device, comprising:

a read/write head;

a resilient hinged mounting structure having a center for supporting the read/write head;

a slider coupled to the mounting structure;

a dimple post formed on a surface of the mounting structure that is proximal to the read/write head and formed about the center of the mounting structure; and a pair of adhesive pads extending between the mounting structure and the read/write head to bind the mounting structure to the read/write head, the adhesive pads being spaced apart from each other and from the dimple post;

wherein the mounting structure comprises at least two hinged islands that are generally disposed opposite to each other relative to the center of the mounting structure;

wherein the two pads bond to the two hinged islands;

wherein the two pads and the dimple post each have a height, the heights of the two pads and the dimple post being substantially equal; and wherein the two hinged islands are offset along the transverse axis relative to the center of the mounting structure so that the two pads rotate about the center of the mounting structure within the two gaps, during a track-follow control actuation.

18. The head gimbal assembly of claim 17, wherein the mounting structure comprises a flexure tongue.

19. The head gimbal assembly of claim 17, wherein the flexure tongue comprises the two hinged islands; and wherein the two hinged islands are secured directly to the read/write head.

20. The head gimbal assembly of claim 17, wherein the read/write head comprises a microactuator; and wherein the two hinged islands are secured directly to the microactuator.

21. The head gimbal assembly of claim 20, wherein the microactuator comprises a piezoelectric actuator that deforms under the effect of a potential.

22. A data storage device comprising:

a head gimbal assembly comprising a read-write head;

a resilient hinged mounting structure having a center;

a pair of adhesive pads binding the mounting structure to the read-write head, the adhesive pads being space apart from each other; and a dimple post substantially coaxial with the center and disposed between the adhesive pads;

wherein the mounting structure comprises at least two hinged islands that are generally disposed opposite to each other relative to the center of the mounting structure, a first one of the adhesive pads contacting a first one of the hinged islands and a second of the adhesive pads contacting a second one of the hinged islands;

wherein the hinged islands are offset along a transverse axis relative to the center of the mounting structure;

wherein a conductive path and a dam are formed on each of the adhesive pads that are formed on each hinged island; and wherein the dam on each pad comprises an adhesive dam having a height, the heights of the dams on the hinged island are substantially equal, and the dimple post has a height that is substantially equal to the height of the dams, whereby the dimple post abuts the slider.

23. The data storage device of claim 22, wherein the mounting structure comprises a flexure tongue.

24. The data storage device of claim 23, wherein the flexure tongue comprises the two hinged islands; and wherein the two hinged islands are secured directly to the slider.

25. The data storage device of claim 22 further comprising a microactuator that is interposed between the slider and the flexure tongue; and wherein the two hinged islands are secured directly to the microactuator.

26. The data storage device of claim 25, wherein the microactuator comprises a piezoelectric actuator that deforms under the effect of a potential.

27. A method for causing a structural deformation of a resilient hinged mounting structure to rotate a head in a data storage system during a track-follow control actuation operation, comprising:

defining a center of the resilient hinged mounting structure;

mounting a slider onto the mounting structure;

forming a dimple post on the mounting structure about the center of the mounting structure; and bonding the mounting structure to the slider with two adhesive pads, the adhesive pads being spaced apart from each other on opposite sides of the dimple post;

wherein the mounting structure comprises at least two hinged islands that are generally disposed opposite to each other relative to the center of the mounting structure, a first one of the adhesive pads contacting a first one of the hinged islands and a second of the adhesive pads contacting a second one of the hinged islands;

wherein the hinged islands are offset along a transverse axis relative to the center of the mounting structure;

wherein a conductive path and a dam are formed on each of the adhesive pads that are formed on each hinged island; and wherein the dam on each pad comprises an adhesive dam having a height, the heights of the dams on the hinged islands are substantially equal, and the dimple post has a height that is substantially equal to the height of the dams, whereby the dimple post abuts the slider.

28. The method of claim 27, wherein the mounting structure comprises a flexure tongue.

29. The method of claim 28, wherein the flexure tongue comprises the two hinged islands; and further comprising securing the two hinged islands directly to the slider.

30. The method of claim 28 further comprising a microactuator that is interposed between the slider and the flexure tongue; and further comprising securing the two hinged islands directly to the microactuator.

31. The method of claim 30, further comprising applying a potential to the microactuator that comprises a piezoelectric actuator, to cause the microactuator to deform.

* * * * *

UNITED STATES PATENT AND TRADEMARK OFFICE
CERTIFICATE OF CORRECTION

| | |
|---|---|
| PATENT NO. | : 7,057,857 B1 |
| APPLICATION NO. | : 10/326514 |
| DATED | : June 6, 2006 |
| INVENTOR(S) | : Yimin Niu et al. |

Page 1 of 1

It is certified that error appears in the above-identified patent and that said Letters Patent is hereby corrected as shown below:

Col. 14, Line 28: delete "island" and insert --islands-- therefor.

Signed and Sealed this

Sixteenth Day of January, 2007

JON W. DUDAS
*Director of the United States Patent and Trademark Office*